C. Weitman,

Broom,

Nº 32,322. Patented May 14, 1861.

Witnesses:

Inventor:

UNITED STATES PATENT OFFICE.

C. WEITMAN, OF INDEPENDENCE, IOWA.

BROOM.

Specification of Letters Patent No. 32,322, dated May 14, 1861.

*To all whom it may concern:*

Be it known that I, C. WEITMAN, of Independence, in the county of Buchanan and State of Iowa, have invented a new and useful Improvement in the Manufacture of Brooms; and I do hereby declare that the following is a full, clear, and exact description thereof, reference being had to the accompanying drawings, making a part of this specification, in which—

Figure 2:
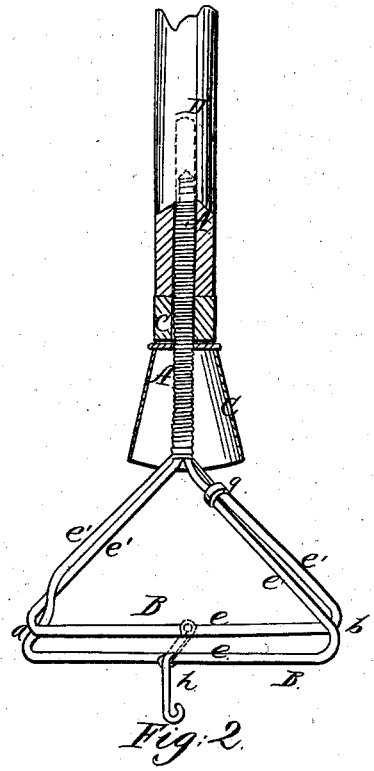
Figure 1:
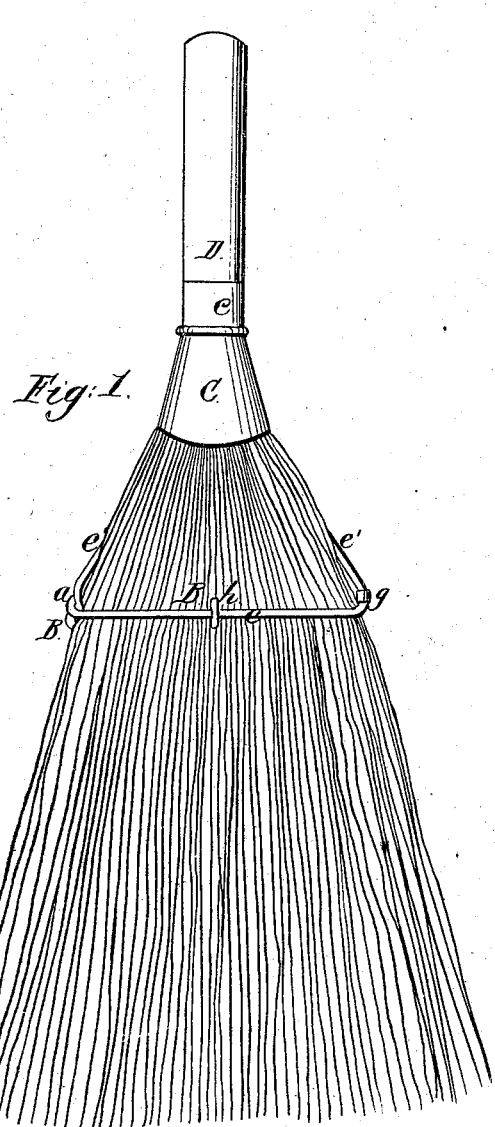

Figure 1, is a view of my improved broom when finished. Fig. 2, is a perspective sectional view of the frame of the improved broom of Fig. 1.

Similar letters of reference indicate corresponding parts in both figures.

The object of this invention and improvement in brooms is to so construct the parts, which contain and confine the whisks of broom corn, that any person, although unskilled in the art of making the brooms hitherto used without tools may take an old and useless broom to pieces and substitute new whisks of broom corn for the old.

The nature of my invention consists in combining with a conical cap, screw rod and nut fastening two wire straps and a clamping slide which latter confine the straws in a proper position, while the former protect and confine the ends of the whisks and give the desired shape to the broom, as will be hereinafter fully explained.

To enable my invention to be fully understood, I will proceed to describe its construction and operation.

In Figs. 1 and 2 of the accompanying drawings, A, represents a straight screw rod on the lower end of which two triangular shaped wire frames B, B, are welded, or otherwise secured. These wire frames are both of the same size, and of sufficient size to receive a suitable amount of broom corn to make a broom. The wire frames B, B, serve as the clamps for confining the whisks of broom corn in their proper places, for giving the required flat shape to the broom when finished. The frames B, B, are secured together at $a$, by twisting each wire around the other but at $b$,—the opposite angles the frames are left open until the broom material is all adjusted in its proper place.

C, is a metal cap of a conical shape which is put loosely on the screw rod A, with its flaring end downward. This cap is used to receive and confine the butts or upper ends of all the whisks which are used in making the broom, as will be hereinafter further described.

D, is the handle of the broom which has a metal ferrule $c$, secured to its lower end, and through the center of this ferrule a female screw is tapped for receiving the rod A, which passes through the ferrule and into a hole which is made in the handle D, as shown in Fig. 2 of the drawings. This ferrule or nut $c$, which is on the handle D, serves to force the flaring cap C, down hard over the ends of the whisks, and to confine them firmly together in said cap.

Having thus described the several principal parts which form the improved broom frame, I will now show how a broom is made therewith. The ends of the whisks of broom corn are passed up between the two wires $e$, $e$, of frames B, B, and drawn on each side of the wires $e'$, $e'$. When the required quantity of material to make a broom has been in this manner brought together, the upper ends of the whisks are all made even and the cap C, is forced down over them, as shown in Fig. 1, and the handle D, is screwed down so as to confine the cap C, in place. A small metal slide $g$, shown in Figs. 1 and 2 is now moved down to the position shown in Fig. 2, so as to clamp the wire frames closely together on the side which was at first left open, as before described. The short hooked link $h$, is now hooked across the two wires $e$, $e$, and this still further binds the whisks between the wires $e$, $e$, and stiffens the broom. The broom material is now trimmed and the broom is ready for use. When such a broom is worn out the new broom material may be substituted for the old by simply removing link $h$, pushing slide $g$, up to the position shown in Fig. 2, and loosening the cap C, by unscrewing the handle D, and then introducing new broom corn as before described. In this way a set of broom fixtures will last for years the broom corn being replenished when it is worn out.

Having thus described my invention what I claim as new and desire to secure by Letters Patent, is,

The two wire frames B, B, united to or forming a part of screw rod A, and otherwise constructed as herein described, in combination with the slide $g$, the conical cap C, and screw handle D, all arranged as, and for the purposes herein set forth.

C. WEITMAN.

Witnesses:
 JAMES HUNTINGTON,
 ORRIN FIELD.